(No Model.)

L. S. WRIGHT.
TEA OR COFFEE POT.

No. 411,483. Patented Sept. 24, 1889.

Witnesses:
D. H. Duell,
R. C. Duell.

Inventor.
Luther S. Wright
by his attorney
Duell & Benedict.

UNITED STATES PATENT OFFICE.

LUTHER S. WRIGHT, OF GROTON, NEW YORK.

TEA OR COFFEE POT.

SPECIFICATION forming part of Letters Patent No. 411,483, dated September 24, 1889.

Application filed June 15, 1889. Serial No. 314,492. (No model.)

*To all whom it may concern:*

Be it known that I, LUTHER S. WRIGHT, a citizen of the United States, residing at Groton, in the county of Tompkins and State of New York, have invented certain new and useful Improvements in Tea or Coffee Pots; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to certain improvements in coffee or tea pots for which Letters Patent were granted to me February 12, 1889, No. 397,883.

My invention has for its object the connecting the lid to a coffee or tea pot in a different manner than is set forth and described in my said Letters Patent No. 397,883. The disadvantages attending the use of the coffee or tea pot made under said former Letters Patent are found particularly in the manner in which the lever is made to pass through the handle, and also in the fact that the lever passes along the top of the lid to the center of the same. When constructed in this manner, the lid gets out of place easily, for the reason that the lever as arranged cannot be made to perform the functions of the hinge heretofore used to connect the lid to the pot. In addition to this, the lever, being upon the outside of the lid, gives to it an awkward and unfinished appearance.

My improvement consists in novel means for passing the lever through the handle of the coffee or tea pot and then through the lid, along the under side of the same to the center, where it is rigidly attached to said lid.

Figure 1:
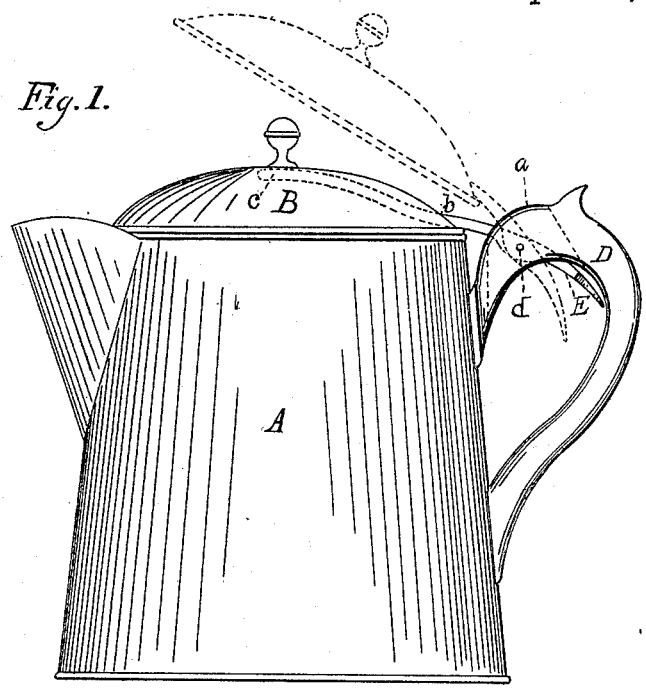
Figure 2:
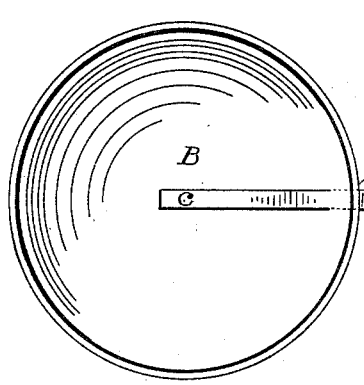
Figure 3:
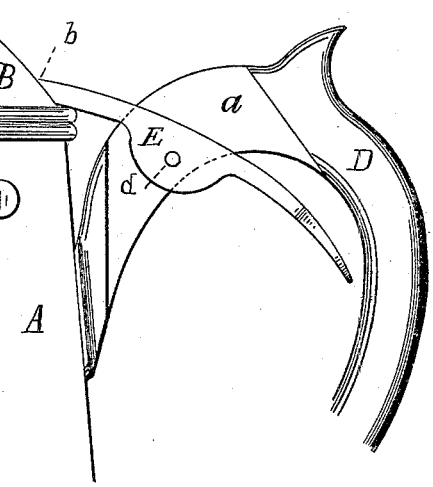

In the drawings, Figure 1 represents a side elevation of a coffee or tea pot embracing my improvement. Fig. 2 is a top plan view of the lid of the coffee or tea pot, as shown upon the under side. Fig. 3 is a sectional elevation of the handle, showing the lever passing through the handle, and also the point, where it passes through the lid of the coffee or tea pot.

In the accompanying drawings, A represents the coffee-pot; B, the lid of the same; D, the handle. E represents the lever attached to the lid B.

The handle D of the coffee-pot is provided with the slot $a$, through which the lever E passes at a point in the upper part of the handle. The slot $a$ is made larger than the lever E, so as to allow the latter to have easy play. The lever E is secured to the handle D and held in place by means of the pin $d$, which passes through the slot $a$ and the lever E. The lever E is made of metal, and may be flat or rounded, as desired. It is intended to be curved, to correspond with the shape of the handle, and is under the upper portion of the same.

The lid B is provided with the slot $b$ at a point near the upper part of the handle D. This is to admit the passage of the lever E, and tightly holds the same. The lever E, after passing through the slot $a$ in the handle, then passes through the slot $b$ in the lid B, and thence along the under side of said lid to the center of the same, where it is rigidly attached to the said lid.

When the lid B is tightly in place, the lever is brought close to the under side of the handle D. When it is desired to raise the lid B, the lever E, beneath the handle, is lowered and performs the functions of a hinge. When the person is using the coffee-pot to pour out the liquid and desires the lid to remain tight, then the lever and handle are held close together in the hand, and this keeps the lid tightly in place.

Having thus described my invention, what I claim as new, and desire to secure by Letters Patent, is—

The combination, with the pot A and handle D, provided with the slot $a$, of the lid B, provided with the slot $b$, and the lever E, rigidly secured to the under side of the lid and passing through the aforesaid slots $a$ and $b$, and curved to correspond to the under side of the handle and lie in proximity thereto when the lid is closed, all constructed and arranged substantially in the manner and for the purpose described.

In testimony whereof I affix my signature in presence of two witnesses.

LUTHER S. WRIGHT.

Witnesses:
R. H. DUELL,
WM. CORCORAN.